(12) United States Patent
Powell (10) Patent No.: US 7,347,482 B2
(45) Date of Patent: Mar. 25, 2008

(54) TONNEAU COVER SYSTEM

(75) Inventor: James C Powell, Sterling Heights, MI (US)

(73) Assignee: Specialty Vehicle Acquisition Corp., Los Angeles, CA (US)

( * ) Notice: Subject to any disclaimer, the term of this patent is extended or adjusted under 35 U.S.C. 154(b) by 26 days.

(21) Appl. No.: 10/931,018

(22) Filed: Aug. 31, 2004

(65) Prior Publication Data

US 2006/0043758 A1   Mar. 2, 2006

(51) Int. Cl.
*B60J 7/16* (2006.01)
(52) U.S. Cl. .............................. 296/107.08; 296/136.05
(58) Field of Classification Search ........... 296/107.08, 296/116, 117, 107.01, 107.09, 136.05, 136.06, 296/136.03
See application file for complete search history.

(56) References Cited

U.S. PATENT DOCUMENTS

| | | |
|---|---|---|
| 4,799,729 A | 1/1989 | Muscat |
| 4,854,634 A | 8/1989 | Shiraishi et al. |
| 5,186,516 A | 2/1993 | Alexander et al. |
| 5,225,747 A | 7/1993 | Helms et al. |
| 5,267,769 A | 12/1993 | Bonne et al. |
| 5,445,326 A | 8/1995 | Ferro et al. |
| 5,451,849 A | 9/1995 | Porter et al. |
| 5,620,226 A | 4/1997 | Sautter, Jr. |
| 5,678,881 A | 10/1997 | Tokarz |
| 5,711,559 A | 1/1998 | Davis |
| 5,743,587 A | 4/1998 | Alexander et al. |
| 5,825,147 A | 10/1998 | Porter et al. |
| 5,904,394 A | 5/1999 | Dilluvio et al. |
| 5,921,608 A | 7/1999 | Schmitt et al. |
| 5,967,593 A | 10/1999 | Schuler et al. |
| 6,030,023 A | 2/2000 | Guillez |
| 6,053,560 A | 4/2000 | Rothe |
| 6,114,819 A | 9/2000 | Porter et al. |
| 6,131,988 A | 10/2000 | Queveau et al. |
| 6,145,915 A | 11/2000 | Queveau et al. |
| 6,246,199 B1 | 6/2001 | Porter et al. |
| 6,254,165 B1 | 7/2001 | Neubrand |
| 6,288,511 B2 | 9/2001 | Porter et al. |
| 6,290,281 B1 | 9/2001 | Durrani et al. |
| 6,299,233 B1 | 10/2001 | Mentink |
| 6,315,349 B1 | 11/2001 | Kinnanen |
| 6,318,792 B1 | 11/2001 | Neubrand et al. |
| 6,318,793 B1 | 11/2001 | Rapin et al. |
| 6,347,828 B1 | 2/2002 | Rapin et al. |
| 6,390,529 B1 | 5/2002 | Bingle et al. |
| 6,419,295 B1 | 7/2002 | Neubrand |
| 6,454,343 B1 | 9/2002 | Wagner et al. |
| 6,497,447 B1 | 12/2002 | Willard |
| 6,508,502 B2 | 1/2003 | Willard |
| 6,508,504 B1 | 1/2003 | Conradt et al. |

(Continued)

*Primary Examiner*—Stephen Gordon
(74) *Attorney, Agent, or Firm*—Harness, Dickey & Pierce, P.L.C.

(57) ABSTRACT

A tonneau cover system uses a unique and novel way to control the movement of a side cover. The system utilizes a drum that is coupled to the side cover and a cable which is coupled to the drum. Movement of the cable causes the side cover to move between open and closed positions. The cable can be coupled to a retractable roof. Movement of the retractable roof between raised and stowed positions causes the side cover of the tonneau cover system to move between its open and closed positions.

15 Claims, 13 Drawing Sheets

U.S. PATENT DOCUMENTS

| | | |
|---|---|---|
| 6,581,989 B2 | 6/2003 | Markisello |
| 6,663,163 B2 | 12/2003 | Koch |
| 2002/0105205 A1* | 8/2002 | Willard .................. 296/107.07 |
| 2003/0020296 A1 | 1/2003 | Koch et al. |
| 2003/0034667 A1 | 2/2003 | Willard |
| 2003/0034668 A1 | 2/2003 | Quindt |
| 2003/0080581 A1 | 5/2003 | Quindt |
| 2004/0119317 A1 | 6/2004 | Wulf et al. |

* cited by examiner

TONNEAU COVER SYSTEM

BACKGROUND AND SUMMARY OF THE INVENTION

This invention generally relates to automotive vehicles with convertible roofs and, more particularly, to an automotive vehicle that uses a tonneau cover system in conjunction with the convertible roof.

Traditional soft-top convertible roofs for automotive vehicles typically employ three, four or five roof bows, having an inverted U-shape spanning transversely across the vehicle for supporting a vinyl, canvas or polyester fiber pliable roof cover. A number one roof bow is mounted to a pair of front roof rails and is typically latched to a stationary front header panel of the automotive vehicle body disposed above the front windshield. A number two roof bow is typically mounted to a pair of center roof rails which are pivotally connected to the front roof rails. Furthermore, a number three, four and five roof bows are commonly mounted to a pair of rear roof rails which are pivotally coupled to the center roof rails. The roof cover can also have a hard or rigid portion along with the pliable portion. For example, reference should be made to U.S. Pat. No. 5,429,409 entitled "Convertible Top", which is incorporated by reference herein. Most traditional convertible roofs are stowed in a bootwell or a stowage compartment that is located aft of a passenger compartment in the vehicle. A tonneau cover is then used to cover the bootwell and conceal the convertible roof from view and/or protect the stowed roof from the environment.

When the convertible roof is designed to reside above and/or on top of the tonneau cover when in the raised position, linkages on the sides of the convertible roof may extend above the tonneau cover. The extension of the linkages above the tonneau cover requires a cutout or recessed area within the tonneau cover to allow the linkages to extend from beneath the tonneau cover to above the tonneau cover. The recess or opening in the tonneau cover, however, can provide an undesirable appearance when the convertible roof is stowed and the tonneau cover is covering the stowed convertible roof. That is, the openings or recesses on the sides of the tonneau cover do not cover up the convertible roof and may result in an aesthetically non-pleasing appearance.

To prevent such a non-pleasing appearance, side covers can be employed to cover up the openings or recesses when the convertible roof is in the stowed position. Such side covers can be separate stand alone covers that are manually positioned or can be automatically positioned once the convertible roof is in the stowage compartment. Heretofore, such automatic operation has typically been performed by the use of independent actuators to actuate the motion of the side covers and/or driving the movement of the side panels with the movement of the tonneau cover.

In accordance with the present invention, a tonneau cover system is provided which uses a unique and novel way to control the movement of a side cover. The system utilizes a drum that is coupled to the side cover and a cable which is coupled to the drum. Movement of the cable causes the cover to move between open and closed positions. In another aspect of the present invention, an automotive vehicle system having a tonneau cover system is disclosed. Movement of the retractable roof between raised and stowed positions causes the side cover of the tonneau cover system to move between its open and closed positions.

In yet another aspect of the present invention, a method of operating a retractable roof and tonneau cover system is disclosed wherein movement of the retractable roof between the raised and stowed positions drives movement of the side cover between the open and closed positions.

The present invention is advantageous in that the side cover is driven directly by movement of the retractable roof. Such direct coordination of the movement facilitates the coordination of the timing of the movements of the retractable roof with the movements of the side cover. Furthermore, the present invention is advantageous in that it provides a simple mechanical mechanism to move the cover between its open and closed positions. Additional objects, advantages and features of the present invention will become apparent from the following description and appended claims, taken in conjunction with the accompanying drawings. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1:
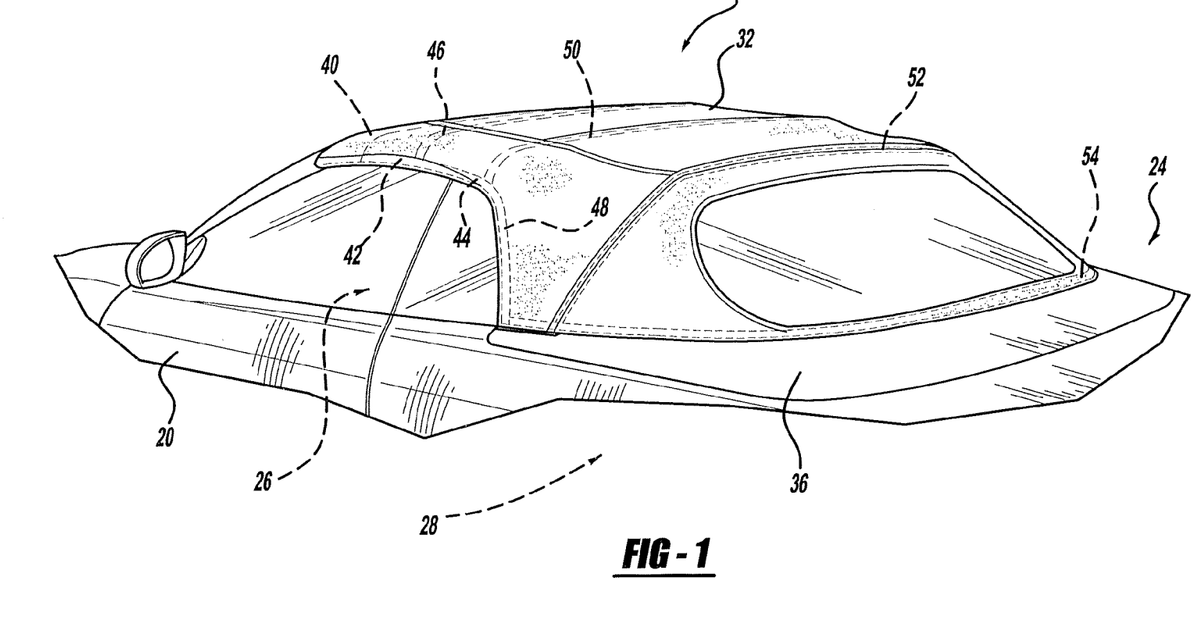
FIG. 1 is a fragmented perspective view of an automotive vehicle having a retractable roof system and a tonneau cover system according to the principles of the present invention.
Figure 2A:
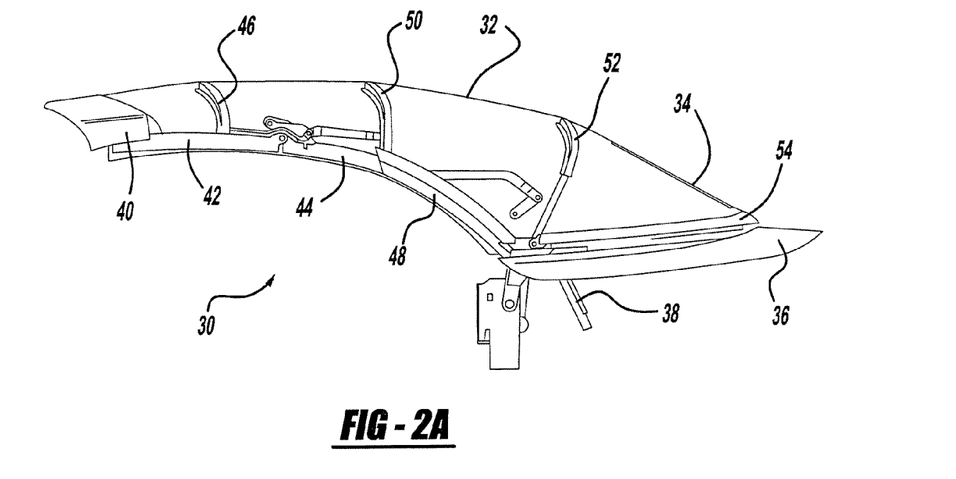
FIGS. 2A-2E are fragmented side elevation views of the vehicle of FIG. 1 with the convertible roof in various positions between the raised and stowed positions and the tonneau cover also in various positions.
Figure 2B:
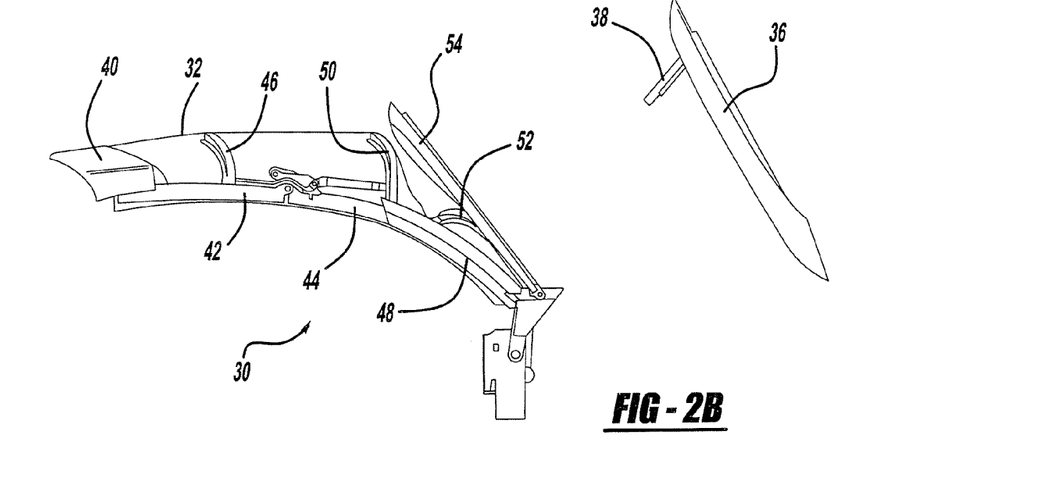
Figure 2C:
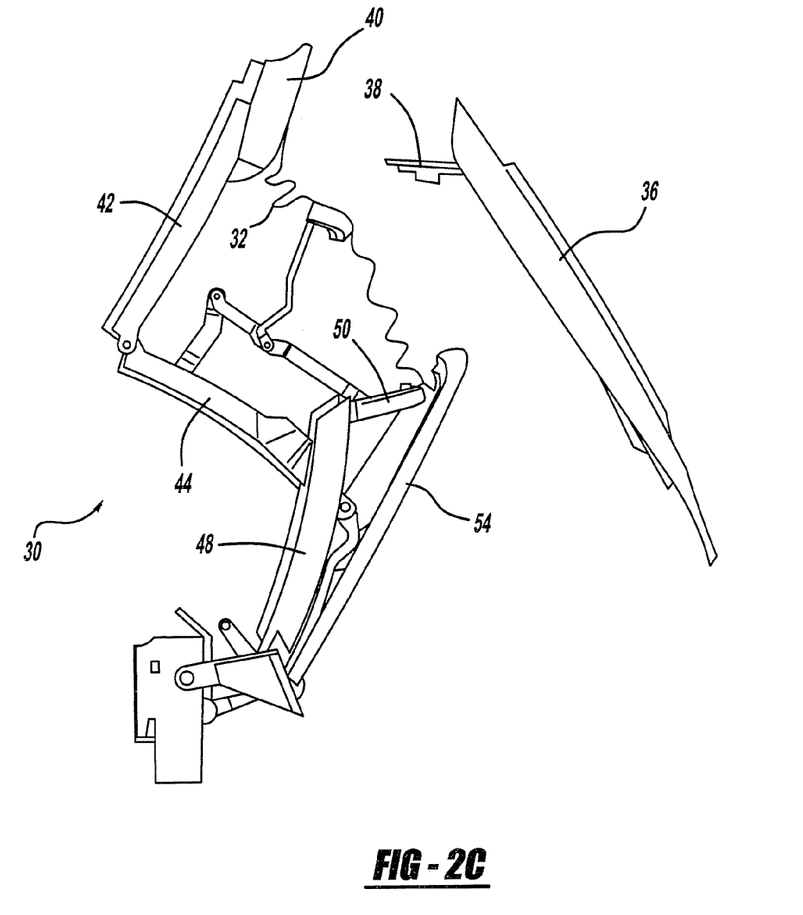
Figure 2D:
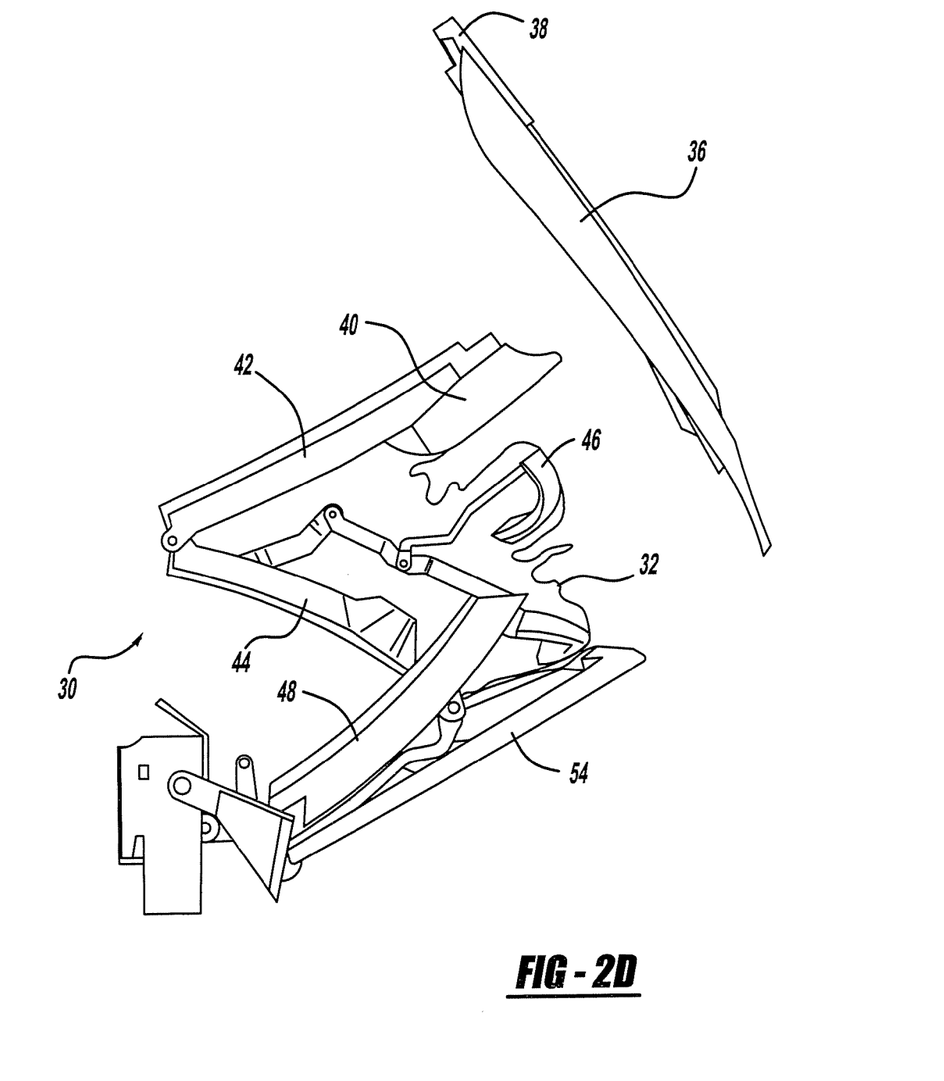
Figure 2E:
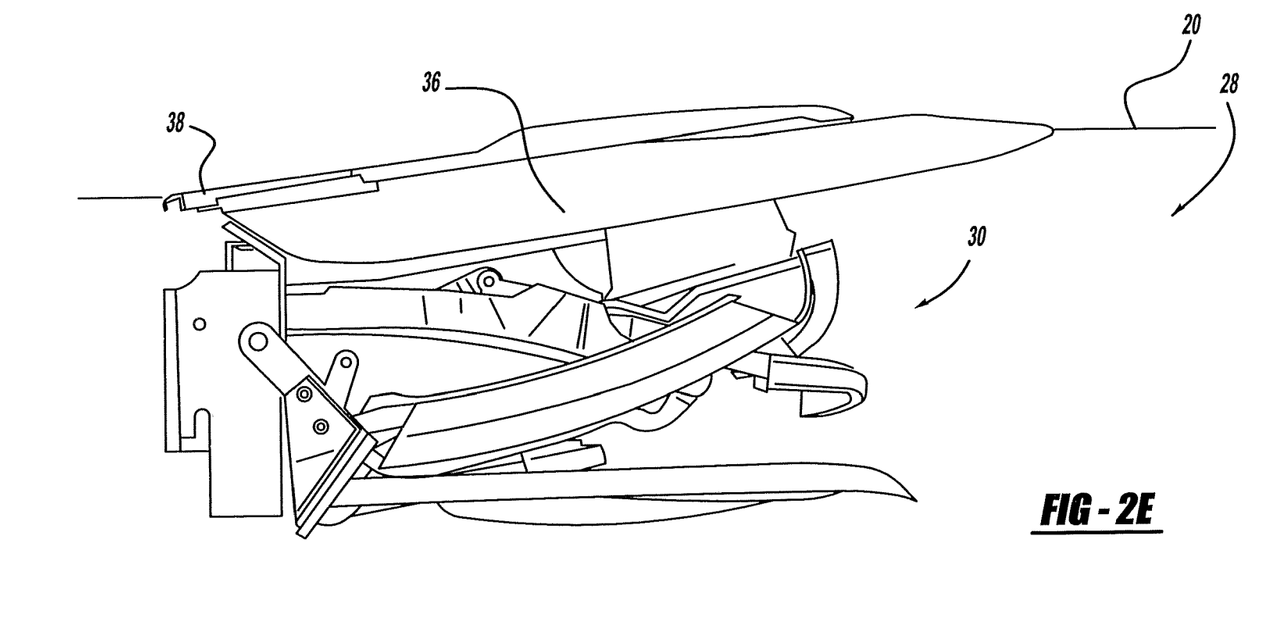

An automotive vehicle 20 having a retractable roof system 22 and a tonneau cover system 24 according to the principle of the present invention is shown in FIG. 1. Vehicle 20 has a passenger compartment 26 and a generally U-shaped bootwell or stowage compartment 28. Stowage compartment 28 is positioned aft of passenger compartment 26 with quarter trim portions extending along a portion of sides of passenger compartment 26. Retractable roof system 22 is of the type utilizing a folding or top stack mechanism 30 that partially supports a roof cover 32 and is operable between a fully raised position, as shown in FIGS. 1 and 2A, through intermediate positions such as those shown in FIGS. 2B-2D, and a fully stowed position, as shown in FIG. 2E. Roof cover 32 is generally made from a pliable material, such as vinyl, canvas or a polyester fabric. If desired, roof cover 32 can have a hard or rigid portion. If desired, the hard portion can be covered by the same material that comprises the soft portion to give a uniform appearance. Roof cover 32 also includes a backlite 34 which is attached to roof cover 32 and is not pivotally coupled to top stack mechanism 30. For example, reference should be made to U.S. Pat. No. 5,887, 936 titled "Backlite System for Use in an Automotive Vehicle Convertible Roof", by Cowsert, and U.S. Pat. No. 6,102,467 titled "Backlite Retention System for Use in an Automotive Vehicle Convertible Roof", by Laurain et al., both of which are herein incorporated by reference. Backlite 34 is made of a rigid material, such as glass or polycarbonate or, optionally, can be made of a pliable transparent material (not shown).

Figure 3:
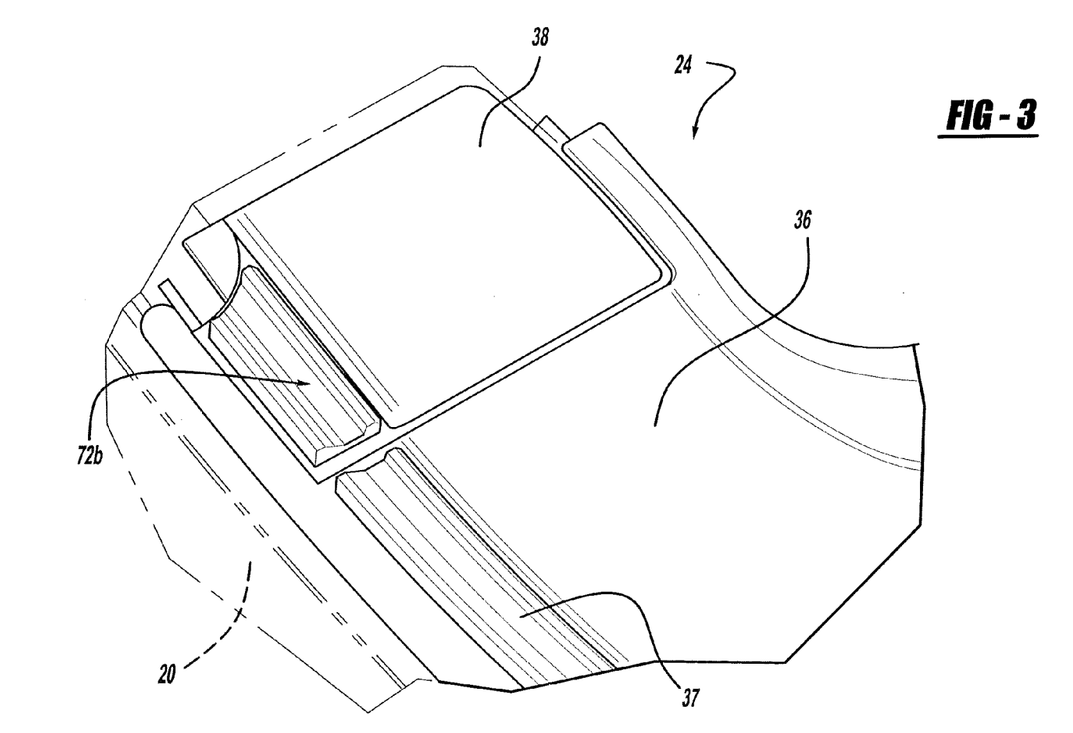
FIG. 3 is an enlarged fragmented perspective view of the side cover and tonneau cover both in their closed position.
Figure 4:
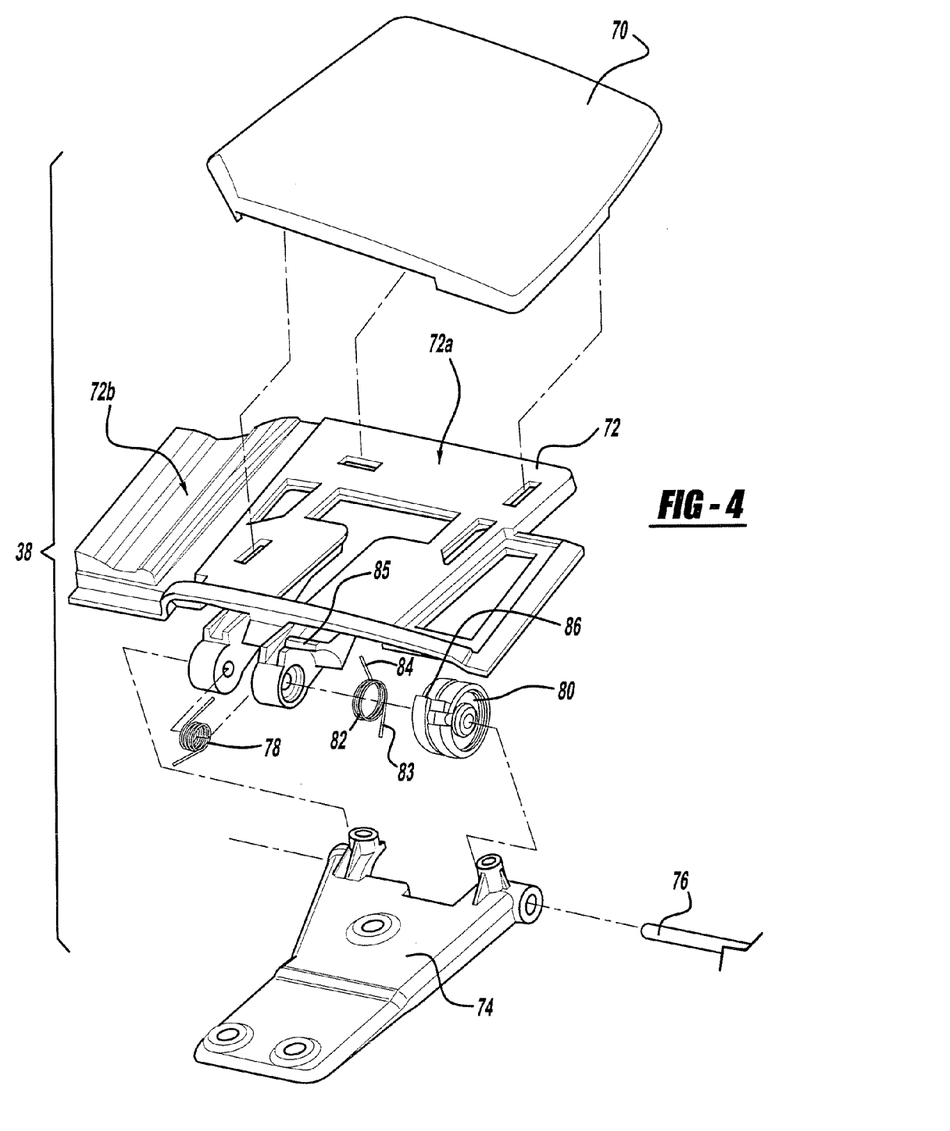
FIG. 4 is an exploded perspective view of the side cover of FIG. 3.
Figure 5:
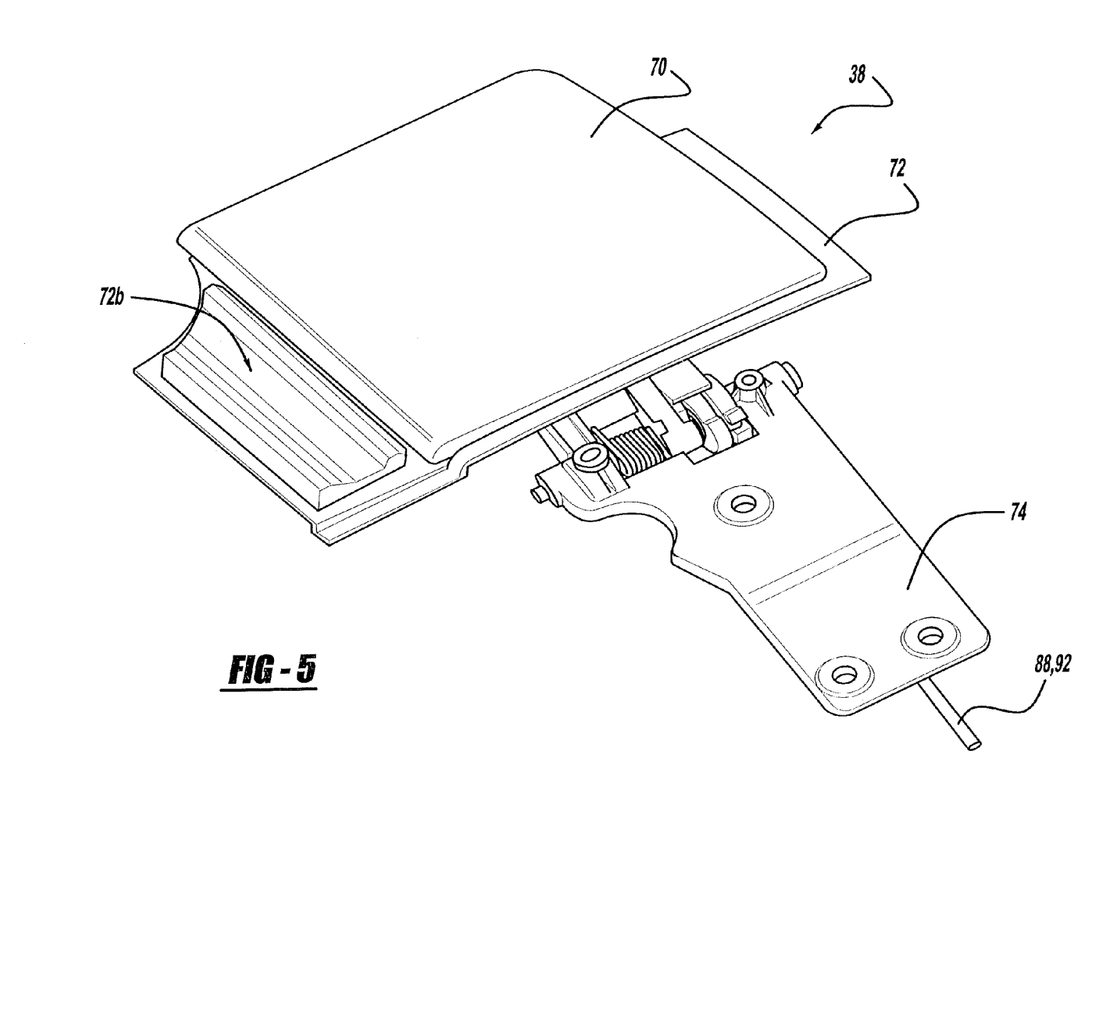
FIG. 5 is a perspective view of the side cover of FIG. 3 detached from the tonneau cover.
Figure 6:
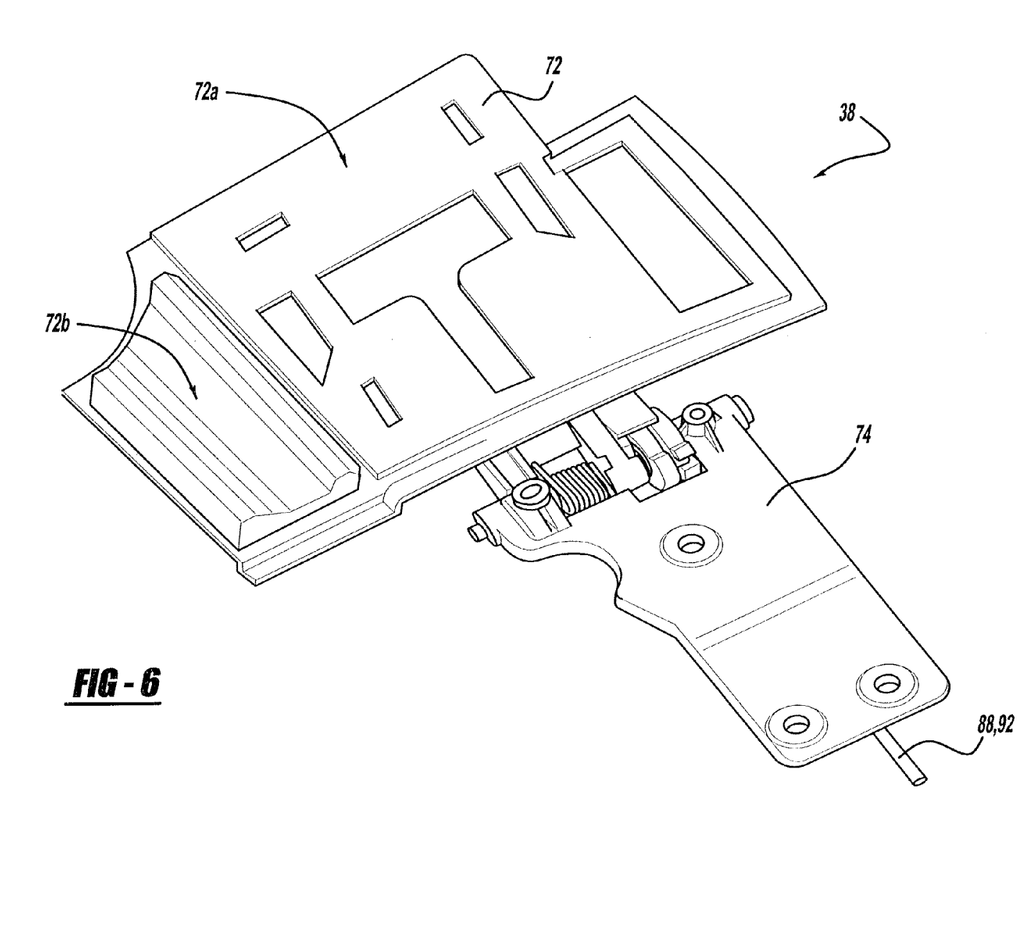
FIG. 6 is a perspective view of the underside of the side cover of FIG. 5.
Figure 7:
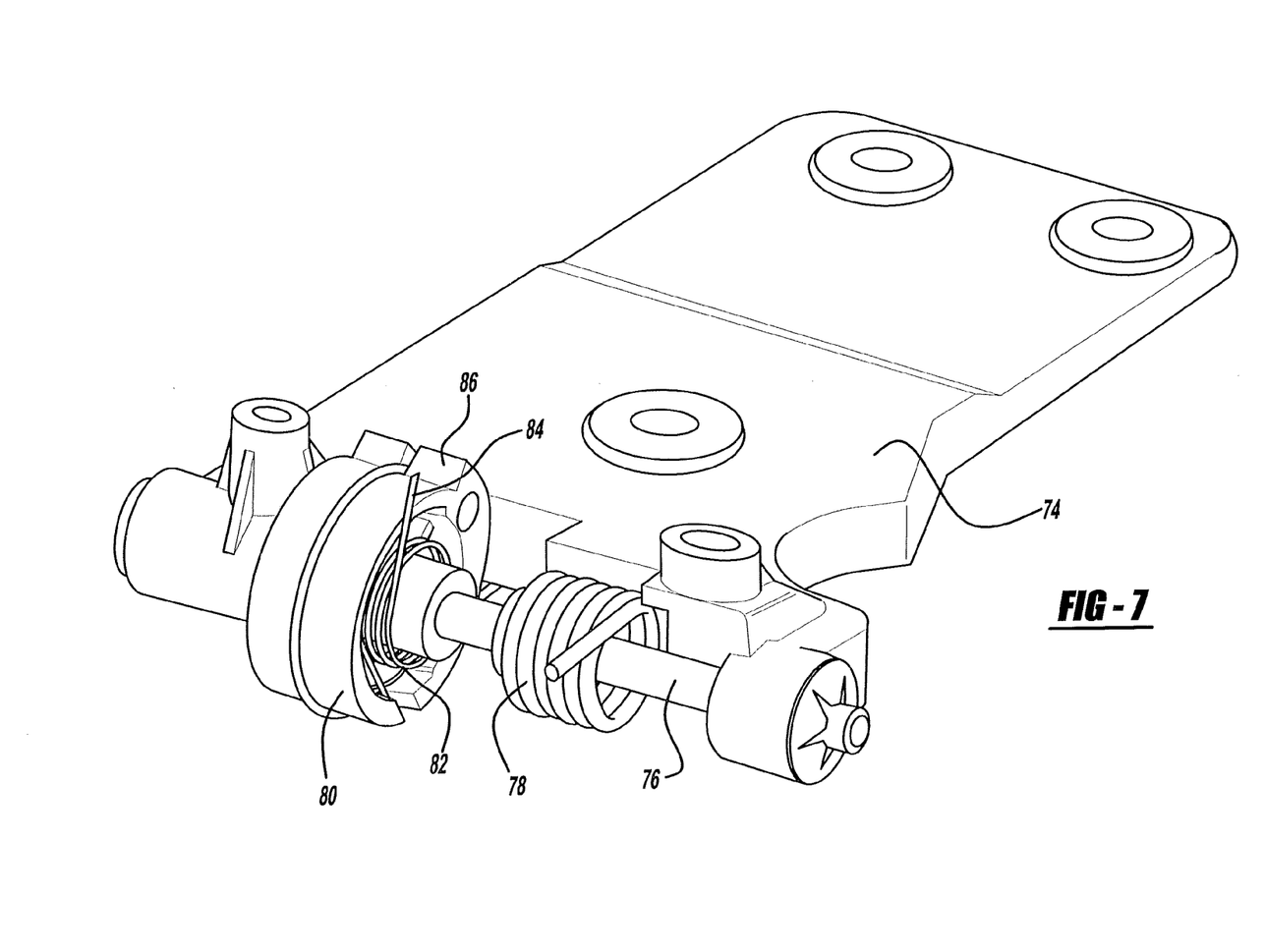
FIG. 7 is a perspective view of the top side of the mounting plate of the side cover.
Figure 8:
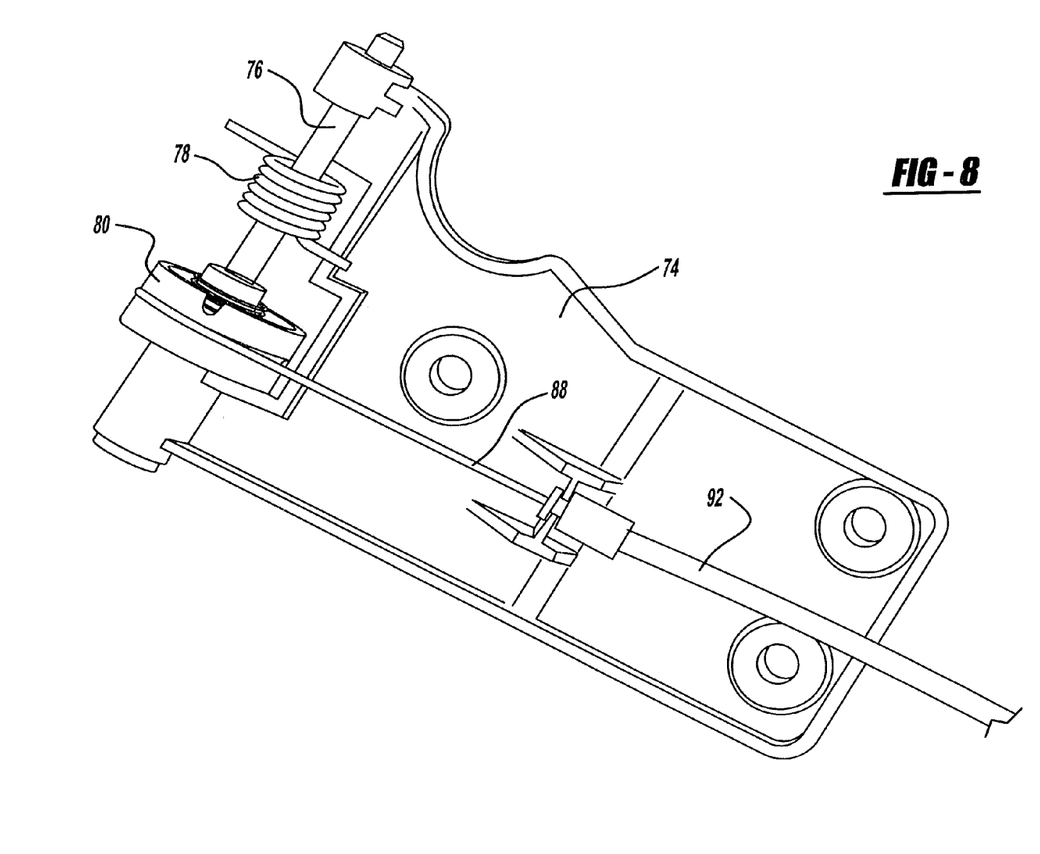
FIG. 8 is a bottom perspective view of the mounting plate of the side cover of FIG. 7.
Figure 9:
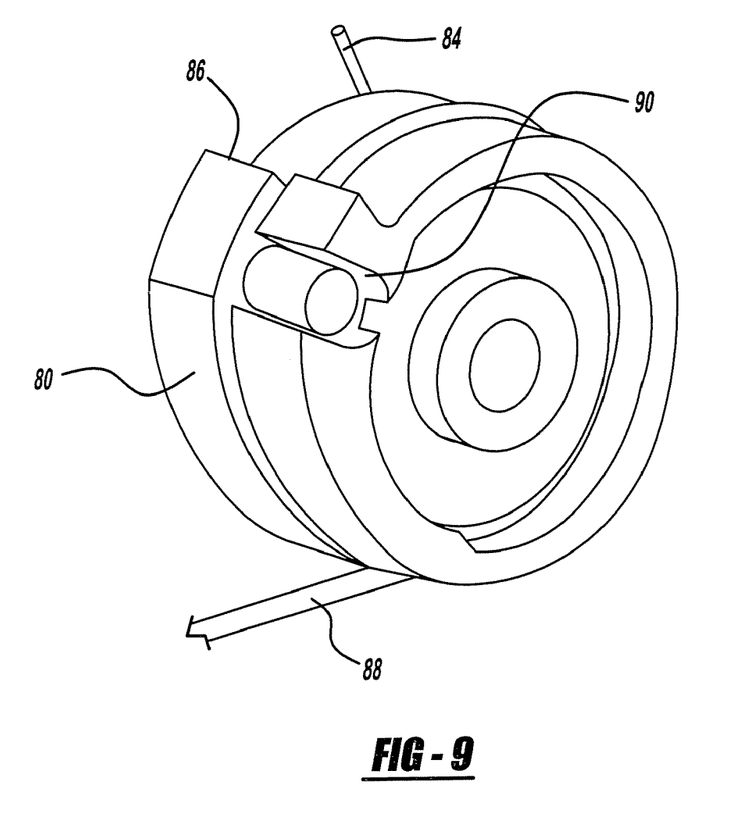
FIG. 9 is a perspective view of the drum of the side cover.

Tonneau cover system 24 includes a main or primary cover 36 that is operable to cover a majority of stowage compartment 28 and a pair of secondary or side covers 38 that are operable to close the quarter trim portions of stowage compartment 28 when retractable roof system 22 is in the stowed position, as shown in FIG. 2E. Primary cover 36 has a track or recessed area 37 in which a portion of top stack mechanism 30 resides when in the raised position. Track 37 has an exterior contour configured to received the portion of top stack mechanism 30. Side covers 38 are coupled to primary cover 36 and move with the movement of primary cover 36. Primary cover 36 moves between a closed position wherein it is substantially horizontally oriented and aligned with the body of vehicle 20, as shown in FIGS. 1, 2A and 2E, to an open position, as shown in FIGS. 2B-2D, wherein retractable roof system 22 can be operated to move the retractable roof between the raised position and the stowed position within stowage compartment 28. Side covers 38 are operable between an open position, as shown in FIGS. 1 and 2A, to a closed position, as shown in FIGS. 2D, 2E and 3. In the closed position, as shown in FIG. 3, side cover 38 is substantially flush with primary cover 36 and serves to conceal the quarter trim portions of stowage compartment 28 and the retractable roof stowed therein. When retractable roof system 22 is in the raised position, side cover 38 is in its open position allowing components of top stack mechanism 30 and roof cover 32 to move to the raised position while primary cover 36 serves to conceal a majority of stowage compartment 28, as described in more detail below.

Referring to FIGS. 1 and 2A-E, retractable roof system 22 and tonneau cover system 24 and the various components of those systems are shown symmetrical about a longitudinal, fore-and-aft center line (not shown) of vehicle 20. Top stack mechanism 30 includes right and left roof linkages on respective right and left sides of vehicle 20. Side covers 38 include right and left side covers on respective right and lefthand sides of primary cover 36. For brevity, only the driver's side of the components of retractable roof system 22 and tonneau cover system 24 are shown and discussed, however, it should be understood that components for the other side are also provided as part of retractable roof system 22 and tonneau cover system 24 and are mirrored images of the driver's side. Also, when using the terms "fore" and "aft" and "front" and "back" and "forward" and "rearward" in describing the components of retractable roof system 22 and tonneau cover system 24, such reference refers to the orientation of the components when retractable roof system 22 is in its fully raised position and primary cover 36 of tonneau cover system 24 is in its closed position.

Top stack mechanism 30 includes a first roof bow 40 that extends transversely across vehicle 20 and has a front edge that is latched to a stationary front header panel of vehicle 20 disposed above the front windshield when in the fully raised position, as shown in FIGS. 1 and 2A. First roof bow 40 is connected to a front roof rail 42. Alternatively, first roof bow 40 can be formed integrally with front roof rail 42. For example, first roof bow 40 and front roof rail 42 can be integrally cast from aluminum or magnesium alloy. Front roof rail 42 is pivotally coupled to a center roof rail 44. A second roof bow 46 extends transversely across vehicle 20 and is pivotally coupled to top stack mechanism 30. Center roof rail 44 is pivotally coupled to a rear roof rail 48. A third roof bow 50 extends transversely across vehicle 20 and is pivotally coupled to top stack mechanism 30 and extends between opposing pairs of rear roof rails 48. A fourth roof bow 52 is pivotally coupled to rear roof rails 48 and extends transversely across vehicle 20. A fifth roof bow 54 is pivotally coupled to rear roof rails 48, extends transversely across vehicle 20, and rests in track 37 on primary cover 36 when in the raised position, as shown in FIGS. 1 and 2A. Various additional links and/or linkage assemblies interconnect the roof rails and roof bows to coordinate their movement relative to one another when moving between the raised and stowed positions. Retractable roof system 22 can be manually operated or, alternatively, can incorporate one or more actuators to control and coordinate the movement of the various roof rails and roof bows to automatically move retractable roof system 22 between the raised and stowed positions.

Referring now to FIGS. 4-10, details of side cover 38 of tonneau cover system 24 are shown. Side cover 38 includes a garnish or trim portion 70 that provides a desired exterior surface contour. Preferably, the exterior contour of garnish 70 is complementary to the exterior contour of the portion of primary cover 36 immediately adjacent garnish 70. Garnish 70 is attached to a carrier or frame 72 which is pivotally connected to a mounting plate 74 with a pin 76. A first portion 72a of frame 72 is covered by garnish 70 while a second portion 72b of frame 72 is not covered by garnish 70. The second portion 72b of frame 72 has an exterior contour that is complementary to the exterior contour of track 37 of primary cover 36. Mounting plate 74 is operable to be connected to an underside of primary cover 36 so that movement of frame 72 about pin 76 causes side cover 38 to move between its open and closed positions, as described below. Frame 72 and mounting plate 74 can be made from a variety of materials. For example, frame 72 and mounting plate 74 can be made from a metal, such as aluminum, magnesium and steel or from a polymeric material. Preferably, frame 72 and mounting plate 74 are made from ABS plastic or polypropylene with glass fill.

A biasing member 78, in this case in the form of a torsion spring, is positioned around pin 76 between mounting plate 74 and frame 72. One end of spring 78 engages with frame 72 while an opposite end of spring 78 engages with mounting plate 74 to bias frame 72 relative to mounting plate 74. Specifically, spring 78 biases frame 72 and side cover 38 to its closed position wherein garnish 70 is substantially flush with primary cover 36, as described in more detail below. A drum 80 is rotatably disposed on pin 76 between frame 72 and mounting plate 74. Drum 80 can be made from a variety of materials. Preferably, drum 80 is made from a talc-filled nylon which helps to aid in smooth rotation of drum 80 around pin 76. A biasing member 82, in this case in the form of a torsion spring, is disposed around pin 76 between frame 72 and mounting plate 74 and engaged with drum 80. Spring 82 biases drum 80 relative to frame 72. One end 83 of spring 82 is engaged with drum 80 while the other end 84 is free and engages with a stop 85 on frame 72 during a portion of the movement of side cover 38 between its open and closed positions, as described below. Drum 80 has a projection 86 that also engages with stop 85 on frame 72 during a portion of the movement of side cover 38 between its open and closed positions. Drum 80 serves as the actuating component for causing movement of side cover 38 from its closed position to its open position, as described below.

Figure 10:
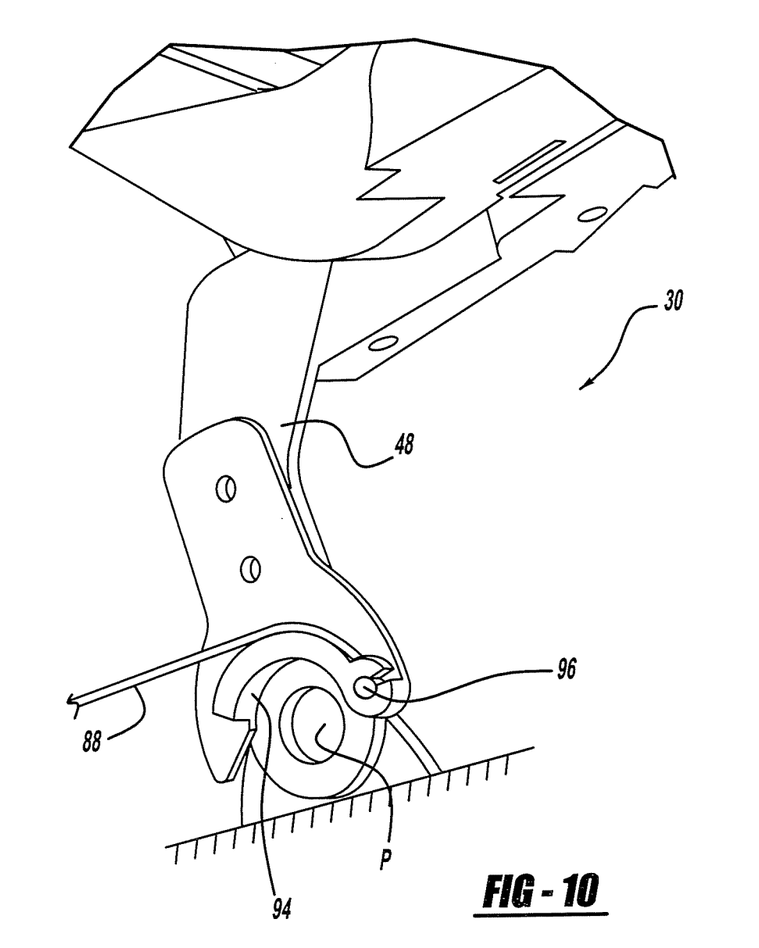
FIG. 10 is an enlarged fragmented perspective view of the rear roof rail of the convertible roof of FIG. 1 showing the cable connection thereto.

A cable 88 (only one shown and best seen in FIGS. 8 and 9) extends from each drum 80 to a component of top stack mechanism 30. One end of cable 88 has a swaged barrel that drops into a complementary retaining recess 90 in drum 80 to secure cable 88 to drum 80. Cable 88 extends along an underside of mounting plate 74 and into a protective sheath 92. Cable 88 is routed along an underside of primary cover 36 and terminates at top stack mechanism 30. As shown in FIG. 10, the opposite end of cable 88 is secured to a partial drum 94 attached to rear roof rail 48 at the location of the pivot point between rear roof rail 48 and vehicle 20. Partial drum 94 is fixedly secured to rear roof rail 48 such that partial drum 94 rotates with the rotation of rear roof rail 48 about its pivot to vehicle 20. Partial drum 94 also includes a retaining recess 96 to secure the swaged barrel end of cable 88 to partial drum 94. Partial drum 94 is preferably made from nylon, although other materials can be used.

The interconnection of side cover 38 with top stack mechanism 30 via cable 88 allows the operation of side cover 38 between its open and closed positions to be controlled by the movement of top stack mechanism 30. Referring to FIGS. 2E and 3, when retractable roof system 22 is in its stowed position, side cover 38 is in its closed position and substantially flush with primary cover 36. Side cover 38 is in its up or closed position due to the biasing of spring 78 which causes frame 72 to move relative to mounting plate 74 to the closed position. When it is desired to raise retractable roof system 22, tonneau cover system 24 is operated to cause primary cover 36 to move from its closed position to its open position, as shown in FIG. 2D. Side cover 38 moves with the movement of primary cover 36. With primary cover 36 in its open position, top stack mechanism 30 can then begin to move from the stowed position to the raised position. As top stack mechanism 30 unfolds, rear roof rail 48 rotates about its pivot relative to vehicle 20. The rotation of rear roof rail 48, toward its raised position, causes cable 88 to pull on drum 80. Drum 80 then rotates about pin 76 relative to frame 72 and mounting plate 74. Free end 84 of spring 82 also rotates with the rotation of drum 80 relative to mounting plate 74 and frame 72. Once drum 80 has rotated a sufficient amount, free end 84 of spring 82 engages with stop 85 of frame 72. Continued rotation of drum 80 causes spring 82 to tension and eventually causes projection 86 to engage with stop 85 of frame 72.

Drum 80 continues to rotate about pin 76 as rear roof rail 48 continues to pivot toward its raised position. Now, however, continued rotation of drum 80 also causes frame 72 and garnish 70 (side cover 38) to begin to pivot about pin 76 relative to mounting plate 74 and primary cover 36 due to the engagement of projection 86 with stop 85. Thus, drum 80 rotates both relative to and in unison with frame 72 during movement of retractable roof system 22 from the stowed position to the raised position. The result is that side cover 38 remains in its closed position during the initial portion of movement of top stack mechanism 30 from its fully retracted position toward its raised position. When rear roof rail 48 reaches the fully raised position, as shown in FIGS. 2A and 2B, side cover 38 is in its fully open position. Tonneau cover system 24 can then be operated to cause primary cover 36 to move to its closed position, as shown in FIGS. 1 and 2A. As primary cover 36 moves to its closed position, the opening formed by having side cover 38 in its open position allows primary cover 36 to move to its closed position without interference caused by the projection of rear roof rail 48 and portions of cover 32 interfering with the positioning of primary cover 36. With primary cover 36 in its closed position, fifth roof bow 54 can then be rotated rearwardly to engage with track 37 on the top surface of primary cover 36.

When it is desired to move retractable roof system 22 from the raised position to the stowed position, fifth roof bow 54 is first moved upwardly and forwardly. When fifth roof bow 54 has been moved a sufficient distance, tonneau cover system 24 is operated to cause primary cover 36 to move from its closed position to its open position thereby exposing stowage compartment 28, as shown in FIG. 2B. Top stack mechanism 30 then begins retraction into stowage compartment 28. During the retraction, rear roof rail 48 rotates rearwardly about its pivot on vehicle 20. The rearward rotation of rear roof rail 48 allows slack to develop in cable 88. Drum 80 is biased by spring 82 which causes drum 80 to rotate and take up the slack in cable 88. While drum 80 is rotating to take up the slack in cable 88, spring 78 moves frame 72 toward the closed position. Side cover 38 rotates in unison with drum 80 until side cover 38 reaches its closed position with garnish 70 engaged with primary cover 36, as shown in FIG. 2D. Once side cover 38 has reached its closed position, any additional slack developed in cable 88 through continued rotation of rear roof rail 48 into stowage compartment 28 will be further taken up by continued rotation of drum 80, which now rotates relative to frame 72. Thus, drum 80 will rotate both in unison with frame 72 and relative to frame 72 during the movement of retractable roof system 22 from the raised to the stowed position. The result is that side cover 38 immediately begins to move from its open position toward its closed position upon movement of top stack mechanism 30 from its raised position toward its retracted position. Additionally, side cover 38 reaches its closed position prior to top stack mechanism 30 reaching its fully retracted position.

Once top stack mechanism 30 has been completely moved into stowage compartment 28, tonneau cover system 24 causes primary cover 36 to move to its closed position, as shown in FIG. 2E. Because side cover 38 is also in its closed position, tonneau cover system 24 serves to substantially cover an entirety of stowage compartment 28, thereby concealing retractable roof system 22 therein.

The dimensions and contour of drum 80 and the dimensions and contour of partial drum 94 are configured to provide a desired motion of drum 80 through the rotation of partial drum 94. For example, the radius of curvature of partial drum 94 can be greater than, equal to or less than the radius of curvature of drum 80. Furthermore, the surface contour of the drums 80, 94 can be configured to provide a cam-like surface wherein the timing of the relative motions can be coordinated by providing dwell spots on the contour of drum 80 and/or partial drum 94. Furthermore, the contours can be eccentric. It should also be appreciated that while partial drum 94 is shown as being fixedly secured to rear roof rail 48 it could also be secured to other components of top stack mechanism 30 that rotate about a fixed pivot relative to vehicle 20. For example, partial drum 94 could be secured to a balance link of top stack mechanism 30 that pivots about a fixed pivot relative to vehicle 20. Furthermore, it should be appreciated that while the present invention is shown as being used with a specific retractable roof system 22, other retractable roof systems can be employed in conjunction with tonneau cover system 24. For example, tonneau cover system 24 can be used with an out-folding convertible roof. Furthermore, tonneau cover system 24 could also be used with a hard-top retractable roof although all of the benefits and features of the present invention may not be realized. Thus, the description of the invention is merely exemplary in nature and variations that do not depart from the gist of the invention are intended to be within the scope of the invention. Such variations are not to be regarded as a departure from the spirit and scope of the invention.

What is claimed is:

1. An automotive vehicle system comprising:
    a retractable roof system including a retractable roof moveable between a raised position and stowed position; and
    a tonneau cover system having a cover operable between open and closed positions to respectively allow access to and cover a portion of a compartment,
    wherein partial movement of said retractable roof between said raised and stowed positions causes said cover to move completely between its open and closed positions.

2. The automotive vehicle system of claim 1, wherein said retractable roof system includes a roof cover and a top stack mechanism operable to move said retractable roof between said raised and stowed positions, and movement of said top stack mechanism causing said cover to move between its open and closed positions.

3. The automotive vehicle system of claim 2, wherein said top stack mechanism includes a plurality of roof rails and movement of one of said roof rails causing said cover to move between its open and closed positions.

4. The automotive vehicle system of claim 3, wherein movement of a rearmost one of said roof rails of said top stack mechanism causes said cover to move between its open and closed positions.

5. The automotive vehicle system of claim 2, wherein a cable interconnects said top stack mechanism to said cover of said tonneau cover system.

6. The automotive vehicle of claim 1, wherein said cover is mechanically linked to said retractable roof.

7. The automotive vehicle of claim 6, wherein said cover is mechanically linked to said retractable roof with a cable.

8. The automotive vehicle of claim 1, wherein said cover pivots between its open and closed positions.

9. The automotive vehicle of claim 8, wherein said cover is a first cover, said tonneau cover system includes a second cover operable between open and closed positions to cover a portion of a compartment, and said first cover is pivotally coupled to said second cover.

10. The automotive vehicle of claim 1, wherein said cover is in its open position when said retractable roof is in said raised position and said cover is in its closed position when said retractable roof is in said stowed position.

11. The automotive vehicle system of claim 1, wherein said cover begins to move between said open and closed positions immediately upon movement of said retractable roof from a fully raised position toward said stowed position.

12. An automotive vehicle system comprising:
    a retractable roof system including a retractable roof moveable between a raised position and stowed position; and
    a tonneau cover system having a cover operable between open and closed positions to respectively allow access to and cover a portion of a compartment,
    wherein said cover begins to move from said open position toward said closed position immediately upon initiation of movement of said retractable roof from a fully raised position toward said stowed position and wherein said cover is a first cover, said tonneau cover system includes a second cover operable between open and closed positions to cover a portion of a compartment, and said first cover is pivotally coupled to said second cover.

13. An automotive vehicle system comprising:
    a retractable roof system including a retractable roof moveable between a raised position and stowed position; and
    a tonneau cover system having a cover operable between open and closed positions to respectively allow access to and cover a portion of a compartment,
    wherein said cover remains in said closed position during initial movement of said retractable roof from said stowed position toward said raised position and moves from said closed position to said open position as a result of continued motion of said retractable roof toward said raised position.

14. The automotive vehicle system of claim 13, wherein said cover is a first cover, said tonneau cover system includes a second cover operable between open and closed positions to cover a portion of a compartment, and said first cover is pivotally coupled to said second cover.

15. The automotive vehicle system of claim 13, wherein said cover is mechanically coupled to said retractable roof and said mechanical coupling drives movement of said cover between said open and closed positions with movement of said retractable roof.

* * * * *